United States Patent [19]

McSherry et al.

[11] 4,294,156
[45] Oct. 13, 1981

[54] HIGH STRENGTH ANCHOR ASSEMBLY FOR FASTENER

[75] Inventors: Thomas W. McSherry, Floral Park; Nathaniel H. Garfield, Harrison, both of N.Y.

[73] Assignee: Mechanical Plastics Corporation, Pleasantville, N.Y.

[21] Appl. No.: 949,006

[22] Filed: Oct. 6, 1978

[51] Int. Cl.³ ..................... F16B 21/00; F16B 13/06
[52] U.S. Cl. ................................. 411/345; 411/344; 411/908
[58] Field of Search .................. 85/3 R, 3 S, 3 K, 80, 85/71, 1 H; 151/41.75; 24/211 P, 211 R

[56] References Cited

U.S. PATENT DOCUMENTS

| 3,143,916 | 8/1964 | Rice | 85/71 |
|---|---|---|---|
| 3,532,024 | 10/1970 | Gutshall | 85/3 R X |
| 3,861,267 | 1/1975 | Collister | 85/3 R |
| 4,043,245 | 8/1977 | Kaplan | 85/3 R |
| 4,075,924 | 2/1978 | McSherry et al. | 85/3 R |
| 4,120,231 | 10/1978 | Neumayer | 85/3 R |

FOREIGN PATENT DOCUMENTS 1318295  5/1973  United Kingdom ................ 85/3 R Primary Examiner—Ramon S. Britts
Attorney, Agent, or Firm—Pennie & Edmonds

[57] ABSTRACT

An improved anchor assembly for retaining an elongated fastener member within an opening defined by a wall portion having at least one concealed side. Such devices typically comprise at least two elongated leg members, means for connecting a pair of adjacent end portions of the leg members, an apertured anchor member coupled to the legs at opposite end portions and a collar member secured to the legs for sandwiching the wall portion between the collar and the anchor member. The improvement comprises providing each of the legs with respective coupling studs aligned along their major transverse dimensions for engaging substantially longitudinal flanges from anchor member on either side thereof or attaching the legs across the minor dimension of the anchor.

6 Claims, 8 Drawing Figures

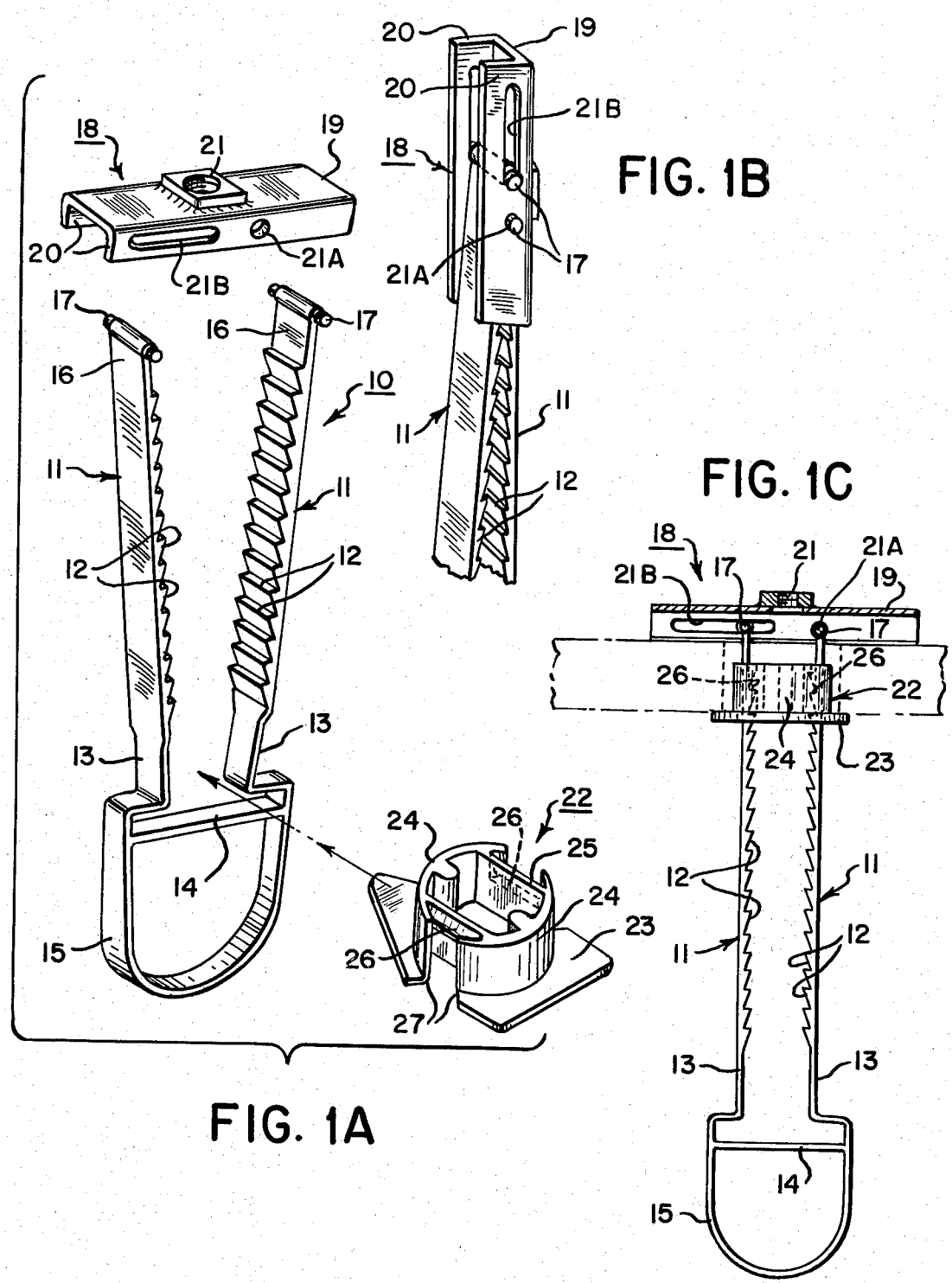

HIGH STRENGTH ANCHOR ASSEMBLY FOR FASTENER

TECHNICAL FIELD

This invention relates to improved blind anchoring devices for fastening objects to hollow walls with elongated fastener members such as screws, bolts and the like.

BACKGROUND ART

The present invention relates to an improved anchor assembly of the type generally described in U.S. Pat. No. 4,075,924 issued to Thomas McSherry et al. on Feb. 28, 1978. The '924 patent describes an anchor assembly comprising a pair of elongated leg members of flexible material and an elongated anchor member coupled to adjacent end portions of the legs. The legs are shown spaced apart along the long dimension of the anchor member. The leg members include resilient means such as transversely bent end portions to resiliently bias the anchor member generally transversely to the legs.

In use, the flexible legs are bent so that the long dimension of the anchor member is oriented along the legs and the anchor is inserted into a hole in a wall or ceiling. The transversely bent end portions of the legs then bias the anchor member back to its transverse position, and suitable collar means are slipped up the legs to sandwich the wall between the anchor and the collar.

While this anchor assembly is highly useful for many applications, the presence of resilient biasing means, such as the bent end portions of the legs, and the need for leg flexibility, tend to limit the maximum strength available in the legs of the device.

Another form of anchor assembly is described in U.S. Pat. No. 4,043,245 issued to Stanley Kaplan on Aug. 23, 1977. In the Kaplan device, the legs are spaced apart across the narrow dimension of the anchor member and each leg is coupled to only one side of the anchor member via a trunion inserted into an apertured flange.

The difficulty with this structure is that each leg is held to the anchor member on only one side. Nothing forces the trunion into the aperture and if it pulls out, the leg comes off. Moreover, the spacing of the legs across the narrow dimension of the anchor member limits the minimum size of the anchor and hence requires larger holes in the wall.

DISCLOSURE OF THE INVENTION

An improved anchor assembly for retaining an elongated fastener member within an opening defined by a wall portion having at least one concealed side. Such devices typically comprise at least two elongated leg members, means for connecting a pair of adjacent end portions of the leg members, an apertured anchor member coupled to the legs at opposite end portions and a collar member secured to the legs for sandwiching the wall portion between the collar and the anchor member. The improvement comprises providing each of the legs with respective coupling studs aligned along their major transverse dimensions for engaging substantially longitudinal flanges from anchor member on either side thereof for attaching the legs across the minor dimension of the anchor.

BRIEF DESCRIPTION OF THE DRAWINGS

The nature, advantages and various features of the invention will appear more fully upon consideration of the illustrative embodiments now to be described in detail in connection with the accompanying drawings.

In the drawings:

FIGS. 1A, 1B and 1C are perspective views from above of a first embodiment of an improved anchor assembly in accordance with the invention;

For convenience of reference, the same structural elements are given the same reference numerals throughout the drawings.

BEST MODE FOR CARRYING OUT THE INVENTION

Figure 2A:
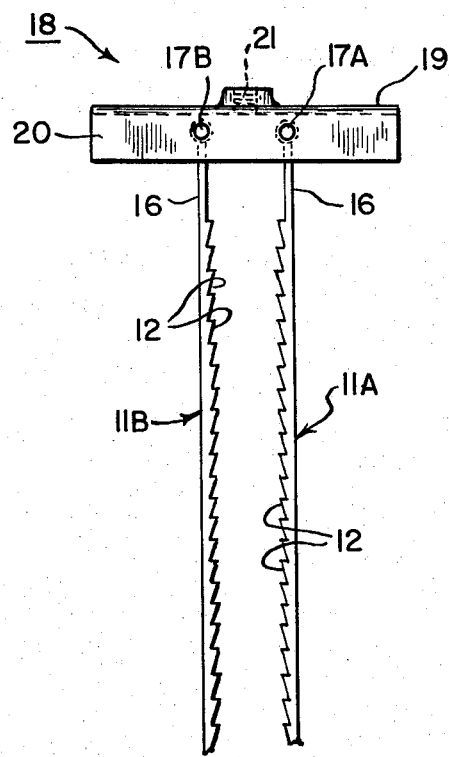
FIGS. 2A and 2B are perspective views of a second embodiment of the invention.

A. Slotted Anchor Member Embodiment (FIGS. 1A, 1B, and 1C)

Referring to the drawings, FIG. 1A illustrates a preferred anchor assembly in accordance with the invention with its component parts shown separately for purposes of the description. The anchor assembly 10 comprises a pair of elongated substantially straight legs 11. The legs 11 are preferably constructed of a resilient material such as plastic or metal which is relatively rigid although it can be elastic for lower strength devices. The legs 11 have opposing serrated surfaces comprised of a plurality of adjacent teeth 12.

The lower end portions 13 of the legs are connected by a bridge 14 and preferably a pulling ring 15 is constructed integrally with the bridge to provide firm control of the legs as will be described.

The upper end portions 16 of each of legs 11 terminates in a coupling stud 17 extending parallel with the major transverse surface of each respective leg. These studs permit coupling of the legs to channel member 18.

Channel member 18 is preferably comprised of metal, such as steel plate, and has a channel-like cross sectional configuration with a central plate section 19 and flanges or end plates 20 extending downwardly therefrom. The flanges may be right-angled with respect to the central plate; however, by constructing them at an angle somewhat less than 90°, e.g. 80°, the anchor member will resist greater compressive forces than if the flanges were perpendicular to the central plate.

The central plate preferably defines an opening 21, such as a threaded opening, for receiving elongated fastener members such as bolts or screws.

Flanges 20 are each provided with a pair of coupling apertures 21A and 21B for receiving the projecting ends of coupling studs 17. The stud of each leg preferably extends across the minor dimension of channel member 18 and extends into corresponding aligned apertures in each of the two transverse flanges 20. Preferably one such aperture is a circular aperture 21A of substantially the same diameter as the stud and the other is an elongated slot 21B for permitting motion of one coupled leg toward and away from the other leg.

The collar 22 is comprised of a generally planar base 23 having flanges 24 extending upwardly therefrom. These flanges 24 and the base 23 are constructed integrally and are preferably of resilient material such as plastic.

The upstanding flanges 24 define slots 25 within which are provided oppositely positioned teeth members 26. The slots 25 communicate with tapered channels 27 which conveniently guide the leg members 11 toward the slots 25 for the purpose of completing the assembly of the collar 22 and legs 11.

The assembly is conveniently fabricated by injection molding the ring and leg assembly of the resilient material having memory with the legs in spread apart position as shown in FIG. 1C; injection molding the collar; and forming the channel with the flanges at an angle somewhat less than the final angle. The channel is then positioned over the upper end portion of the legs spaced apart along the major dimension of the anchor member with apertures 21A and 21B aligned with studs 17. The flanges are then bent to the final angle, engaging each of the studs on both sides of the channel member.

The anchor assembly is conveniently utilized in wall openings dimensioned less than the length of channel member 18. As shown in FIG. 1B, insertion of the channel member 18 into the wall opening is facilitated by the fact that with the coupling arrangement used, the channel member can be rotated about the stud in circular apertures 21A until it is substantially in line with the longitudinal dimension of legs 11. After the channel member clears the concealed surface of the wall, it is released, and the tendency of legs 11 to spring apart returns the channel to its transverse position, as shown in FIG. 1C.

The attachment of the anchor assembly is completed by sliding the collar 22 about the leg members 11 such that a ratcheting engagement occurs between the teeth 12 of the legs and the teeth 26 of the collars. The legs are then pulled through the collar until the wall is effectively sandwiched between the collar and the channel member 18. The excess portions of the legs can be cut away, and a fastener can be inserted through the collar and engaged to the channel member, as by threading.

The combination of straight legs and transverse studs coupling to both sides of the channel substantially enhances the load-carrying capability of the assembly. Moreover, the provision and use of the slotted aperture coupling arrangement permits the use of stronger, relatively rigid legs because the ability of the stud to slide in the slot minimizes the need for flexibility during the process of insertion into a wall.

As a less preferred form of the invention, slots 21B in the flanges 20 can be replaced by a slot in the central plate section 19 and a leg can be slidably engaged therein by conventional trunion coupling rather than by coupling studs. Such a structure has the advantage of permitting the use of relatively rigid leg materials, but its coupling is not as great as is obtained by the use of studs.

Figure 2B:
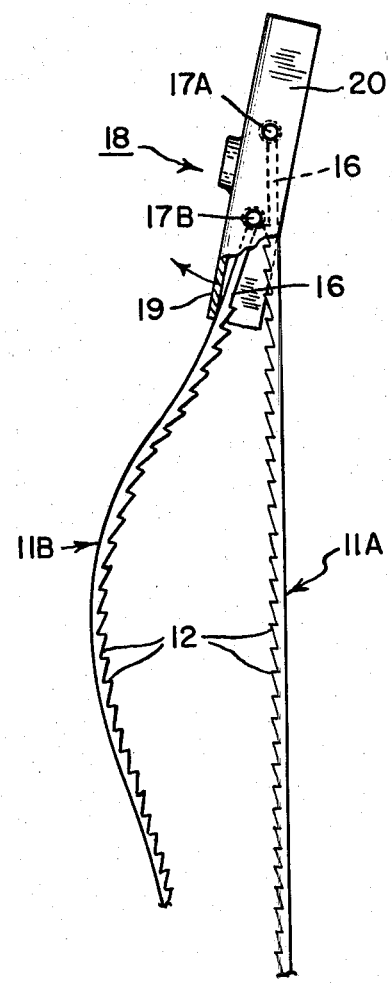

FIGS. 2A and 2B illustrate an alternative embodiment of the invention similar to that of FIG. 1A except that that both coupling apertures 21A and 21B are approximately the same diameter as the coupling stud 17A and 17B.

FIG. 2B shows the structure in position for insertion into a wall opening. The anchor 20 is rotated about one stud, e.g. 17A, to displace downwardly and outwardly the opposite leg 11B. The displaced leg, 11B which is attached to leg 11A at the opposite end, develops a spring-like force opposing the rotation, and when the anchor 20 passes through the opening, the resilient force applied by leg 11B will snap the anchor back to the transverse position.

The advantage of this structure, as compared with prior art structures using bent-end legs, is that the resilient force for snapping the anchor back into transverse position is generated over a relatively large radius of curvature. This fact permits the use of relatively frangibly plastic materials for the legs, such as polystyrene, which can be readily broken off after the wall has been sandwiched between the collar and the anchor. Such frangible materials can be broken off by a manually applied sharp bend without the use of additional tools.

Figure 3:
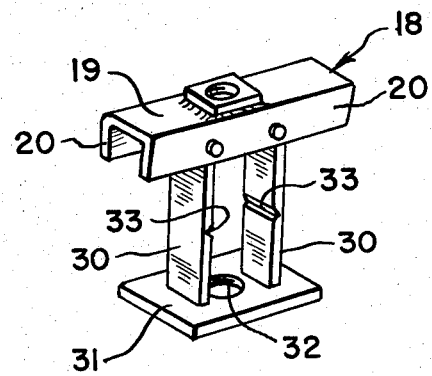
FIG. 3 is a perspective view of a third embodiment of the invention.

FIG. 3 illustrates an alternative form of the invention which substitutes smooth legs 30 for the sawtoothed legs of the FIG. 1 embodiment and an attached base or collar member 31 defining aperture 32 for the collar member of FIG. 1. Preferably legs 30 are provided with the hinge means in the form of relief notches 33 for permitting them to fold between flanges 20 of channel member 18, as the wall is sandwiched between base 31 and the collar member by a fastener (not shown).

Figure 4B:
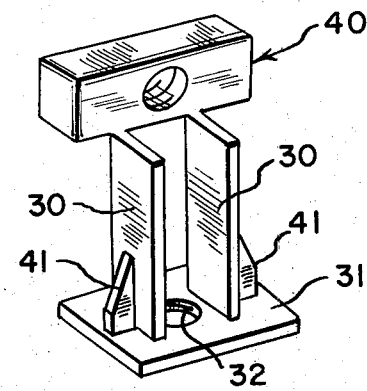
FIGS. 4A and 4B are perspective views of a fourth embodiment of the invention.
Figure 4A:
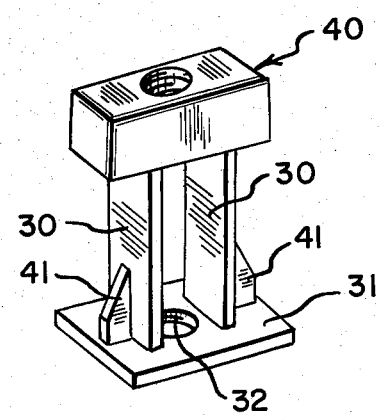

FIGS. 4A and 4B illustrates yet another alternative embodiment of the invention. This embodiment, suitable only for low stress applications, differs from that of FIG. 3 in that an apertured solid plastic anchor bar 40 is substituted for the channel member 18, and the bar 40 is attached to legs 30 by bonding across its minor dimension rather than through the use of coupling studs and apertures. Optional antirotation fins 41 are shown advantageously disposed on base 30 or attached by mechanical techniques.

This device is conveniently fabricated by molding as a unitary structure in the form shown in FIG. 4B. Here the plastic anchor bar 40 is integrally molded to the leg members in an angularly offset position. After molding, the bar 40 is rotated onto the legs and bonded thereto by thermal, mechanical, or ultrasonic bonding techniques.

While the invention has been described in connection with a small number of specific embodiments, it is to be understood that these are merely illustrative of the many other specific embodiments which can also utilize the principles of the invention. Thus numerous and varied devices can be made by those skilled in the art without departing from the spirit and scope of the present invention.

We claim:

1. In an anchor assembly for retaining an elongated fastener member within an opening defined by a wall portion having at least one concealed side, of the type comprising (1) at least two elongated leg members each having a long dimension and a major transverse dimension, (2) means for connecting a pair of adjacent end portions of said leg members, (3) an apertured anchor member coupled to said legs at the opposite end portions thereof, and (4) a collar member secured to said legs for sandwiching said wall portion between said collar and said anchor member, the improvement wherein:

said anchor member comprises a channel member having a pair of flanges each defining a pair of coupling apertures; and each of said legs comprises a substantially straight portion having disposed at the end thereof a coupling stud aligned along said major transverse dimension with each of said coupling studs engaging each of said pair of flanges of said anchor member through said coupling apertures, each of said legs being pivotable in a common plane about an axis of rotation which is coincident with the longitudinal axis of the coupling stud.

2. An anchor assembly according to claim 1 wherein said anchor member is a generally elongated channel member and at least one of said coupling apertures in each flange of said channel member is a slot elongated along the long dimension of said channel member, wherein the coupling stud on the leg engaging the elongated slot is slidable within said slot.

3. An anchor assembly according to claim 1 wherein said legs are formed of elastic material in a spread apart position for biasing said channel member with its long dimension generally transverse to the long dimension of the legs.

4. An anchor assembly according to claim 1 wherein said legs are provided with hinge means for folding between said flanges.

5. An anchor assembly according to claim 4 wherein said hinge means comprise relief notches in said legs.

6. In an anchor assembly for retaining an elongated fastener member within an opening defined by a wall portion having at least one concealed side, of the type comprising (1) at least two elongated leg members, (2) means for connecting a pair of adjacent end portions of said leg members, (3) an anchor member coupled to said legs at the opposite end portions thereof, and (4) a collar member secured to said legs for sandwiching said wall portion between said collar and said anchor member, the improvement wherein:

the anchor member is elongated in a direction substantially perpendicular to the elongated dimension of the leg members; and at least one of said leg members is slidably engaged to said anchor member along the elongated dimension of the anchor member.

* * * * *